(12) United States Patent
Chang et al.

(10) Patent No.: US 8,010,574 B2
(45) Date of Patent: Aug. 30, 2011

(54) SYSTEM AND METHOD FOR INDEXING, SEARCHING AND RETRIEVING SEMANTIC OBJECTS

(75) Inventors: Yuan-Chi Chang, New York, NY (US); Matthew L. Hill, Yonkers, NY (US); Chung-Sheng Li, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/706,345

(22) Filed: Feb. 16, 2010

(65) Prior Publication Data

US 2010/0145931 A1    Jun. 10, 2010

Related U.S. Application Data

(63) Continuation of application No. 10/724,897, filed on Dec. 2, 2003, now Pat. No. 7,716,251.

(51) Int. Cl.
*G06F 17/30* (2006.01)
(52) U.S. Cl. ......... 707/802; 707/804; 707/954; 707/955
(58) Field of Classification Search .................. None
See application file for complete search history.

(56) References Cited

OTHER PUBLICATIONS

Roger Jennings, "Special Edition Using Access 97, Second Edition", Oct. 9, 1997, Que, pp. 1-19.*
Pitas, et al., "Texture Analysis and Segmentation of Seismic Images", Acoustics, Speech, and Signal Processing 1989, ICASSP-89, pp. 1437-1440, vol. 3.
Strelitz, et al., "Integral Transforms, Data Compression, and Automatic Analysis of Seismic Sections", Geoscience and Remote Sensing, IEEE Transactions, 1990, pp. 982-991, vol. 28.
Zheng-He Yao, et al., "A Pattern Recognnition Approach to Detect Oil/Gas Reservoirs in Sand/Shale Sediments", 1992, pp. 462-465, vol. 11.
Chang, et al. "PeiroSPIRE: Indexing and Retrieval of Seismic Data for Oil and Gas Exploration", Society of Exploration Geologists Annual Meeting, Oct. 2003.
Bergman, Lawrence; Castelli, Vittorio; Li, Chung-Sheng; Tilke, Peter; Bryant, Ian; PetroSPIRE: A multi-modal content-based retrieval system for petroleum applications, Sep. 1999, SPIE vol. 3846, pp. 449-460.
Li, Chung-Sheng; Yu, Philip S; Castelli, Vittorio; MALM: A Framework for Mining Sequence Database at Multiple Abstraction Levels, 1998, Conference on Information and. Knowledge Management, Proceedings of the seventh internationa conference on information and knowledge management, pp. 267-272.

(Continued)

*Primary Examiner* — Hung Q Pham
(74) *Attorney, Agent, or Firm* — McGinn IP Law Group, PLLC

(57) ABSTRACT

A method and structure for storing information for one or more semantic objects derived from raw data. A semantic object extracted from the raw data and classified to comprise the semantic object is received, the received semantic object having one or more attributes. A summary of attributes of the semantic object by calculating one or more statistics of one or more of the one or more attributes of the received semantic object, a confidence level of the received semantic object that quantifies a degree of certainty that the received semantic object has been correctly classified and/or labeled; and a compact representation of raw data of the received semantic object are generated. Indexing information for one or more of the summary of attributes and the compact representation of the semantic object is generated. The semantic object, along with its associated summary of attributes, confidence level, compact representation, and indexing information, stored in a semantic object database associated with a database storing the raw data.

18 Claims, 6 Drawing Sheets

OTHER PUBLICATIONS

Li et al., "Comparing Texture Feature Sets for Retrieving Core Images in Petroleum Applications", Jan. 1999, IS&SPIE Conference on Storage and Retrieval for Image and Video Databases VII, SPIE vol. 3656, pp. 2-11.

* cited by examiner

SYSTEM AND METHOD FOR INDEXING, SEARCHING AND RETRIEVING SEMANTIC OBJECTS

CROSS-REFERENCE TO RELATED APPLICATIONS

The present application is a Continuation Application of U.S. patent application Ser. No. 10/724,897, filed on Dec. 2, 2003, now U.S. Pat. No. 7,716,251, issued on May 11, 2010.

BACKGROUND OF THE INVENTION

1. Field of the Invention

The present invention generally relates to semantic objects. More particularly, the present invention relates to indexing, searching and retrieving of semantic objects.

2. Description of the Related Art

Exemplarily, the petroleum industry collects and archives many terabytes of data in the process of exploration for oil and gas resources. This data includes seismic surveys, formation micro imaging, core sample photography, well log data and the like. Search and retrieval of seismic data archives of this data present one of the most difficult challenges due to the requirements of domain specific knowledge and the large volume of data.

Land and sea based seismic surveys are commonly acquired during the process of oil and gas exploration. Most of the existing research in this domain has focused on enhancing features and visualization techniques for the seismic data that is generated from these surveys in order to assist geologists in tasks, such as constructing 3D reservoir models. Once a geologist hypothesizes a reservoir model, it can then be used to choose precise locations for drilling and extraction. However, the amount of seismic data is very large. Therefore, it is very difficult to search and to analyze the seismic data to identify seismic regions that have specific geological characteristics (such as sand channels, strong horizons, faults, etc) in an interactive application.

Indeed, the large amount of seismic data often involves mounting several tapes of tertiary storage to sequentially load the data into a visualization workstation. Once the data has been loaded, a geologist can view and browse the images created directly from the raw seismic data in a manner that is quite similar to the way one might view meteorological data. Using the visualization provided by these systems, a geologist might view successive slices of depth in the data. However, like a common weather map with values such as temperature, wind speed, and precipitation in each city, the seismic data is simply a set of values at each point in space. In both the domains of weather and petroleum geology, an interpreter (such as, for example, a meteorologist or geologist) interprets the data and creates "semantic objects." In meteorology, examples of such semantic objects include "cold front," "low pressure system" or "hurricane." In petroleum geology, geologists are similarly interested in "horizons," "faults," "sand channels," "reservoirs," and the like.

In a visualization system, a user simply views representations of the raw data on a display, and may make annotations that are saved by the system so that they can be retrieved later.

Additionally, even with these systems that enable a petroleum geologist to visualize the raw geologic data, an enormous amount of data is presented and it can be very difficult for a petroleum geologist to identify features in the geology that is being visualized.

Further, the amount of data that is collected has also outpaced the ability for current systems and/or geologists to analyze and even for these systems to store the data.

While the petroleum industry has been exemplarily described above, other industries which analyze, collect and/or store large amounts of data have similar problems.

SUMMARY OF THE INVENTION

In view of the foregoing and other exemplary problems, drawbacks, and disadvantages of the conventional methods and systems, an exemplary feature of the present invention is to provide a method and system which stores semantic objects along with a summary of the attributes of those objects and an index of the summary of the attributes.

In a first exemplary aspect of the present invention, a method for storing a semantic object includes summarizing the attributes of a semantic object, indexing the summary of attributes, and storing the summary of attributes and the index of the summary of attributes.

In a second exemplary aspect of the present invention, a signal-bearing medium tangibly embodies a program of machine-readable instructions executable by a digital processor. The program includes instructions for summarizing the attributes of a semantic object, instructions for indexing the summary of attributes, and instructions for storing the summary of attributes and the index of the summary of attributes.

In a third exemplary aspect of the present invention, a system for storing a semantic object includes a semantic object summarizer that summarizes the attributes of a semantic object, an indexer that indexes the summarized attributes indexing the summary of attributes, and a database that stores the summary of attributes and the index of the summary of attributes.

In an exemplary embodiment of the present invention, semantic objects, which have been created to represent the underlying raw data, are summarized and indexed so that these semantic objects may be easily searched, retrieved and analyzed.

Semantic objects may be organized to represent semantically meaningful and important objects in the real world. For exemplary purposes only, the present specification will describe application of the present invention with geologic data, but, of course, the invention is applicable to any type of data. By organizing a database storage and user interface around semantic objects, rather than simply rendering a set of "raw" geologic data values into an image, an exemplary embodiment of the present invention is more efficient and easier to use than the conventional systems.

A complex subsurface volume in a geologic survey may have approximately 10,000 semantic objects. These semantic objects may include faults, horizons, channels, and the like, as well as, sub-components of these semantic objects. However, the same volume could easily have one billion raw data points from the original geologic survey and, therefore, a system based on semantic objects, rather than raw data, allows for more nimble navigation and manipulation because the amount of data is significantly smaller.

An exemplary embodiment of the present invention is completely different than conventional systems because a user may work at a level of abstraction that is higher than the raw geologic data. The semantic objects are at a higher level of abstraction than the underlying raw geologic data because the semantic objects may represent real-world objects (such as faults, horizons and the like) that were generated based upon the raw geologic data. This is vastly different from the simple visualization of the raw geologic data that has been conventionally used to analyze geologic data.

For example, geologic semantic objects may include slice labels, signal strength, and coordinates of a segment that was surveyed. These types of objects are described by, for example, Texture analysis and segmentation of seismic images Pitas, I.; Kotropoulos, C.; Acoustics, Speech, and Signal Processing, 1989. ICASSP-89., 1989 International Conference on, 23-26 May 1989 Page(s): 1437-1440 vol. 3; Integral transforms, data compression, and automatic analysis of seismic sections Strelitz, R. A.; Keshet, Y.; Geoscience and Remote Sensing, IEEE Transactions on, Volume: 28 Issue: 6, November 1990 Page(s): 982-991; and A pattern recognition approach to detect oil/gas reservoirs in sand/shale sediments Zheng-He Yao; Li-De Wu; Pattern Recognition, 1992. Vol. II. Conference B: Pattern Recognition Methodology and Systems, Proceedings., 11th IAPR International Conference on, 30 Aug.-3 Sep. 1992 page(s): 462-465 which are incorporated herein in their entirety.

Additionally, an exemplary embodiment of the present invention provides quicker navigation through sets of data and lowers storage and throughput requirements because a relatively smaller volume of data that includes semantic objects, is browsed, rather than browsing the much larger volume of data that includes the raw data points.

An exemplary embodiment of the present invention is directed to a method and system for populating a database with geological semantic objects and providing retrieval and annotation functions based on both the raw data and the semantic objects.

Other exemplary embodiments of the present invention are directed to: (1) creating a storage schema based on semantic objects; (2) populating a storage space with instance data of semantic objects of varying class/type; (3) enabling representation of semantic objects via conjunctions of multiple data modalities (i.e. sources of raw data); (4) performing search and search optimization on semantic objects using constraints on either raw data values or semantic object attributes; and (5) supporting multiple levels of detail in the semantic object attributes. An exemplary embodiment of the present invention automates these functions and enables a user to work more closely with the geologic semantic objects in which they are interested, rather than simply working with the raw data (i.e. the results of geologic measurements).

As is clear from the present disclosure, one important application of an exemplary embodiment of the present invention relates to the management of large collections of geological data. Geological data is typically collected in a seismic survey, from which a model of subsurface structure may be derived. However, one of ordinary skill in the art understands that the present invention may also be quite valuable in other fields, such as, without limitation, meteorology, astronomy, and the like.

An exemplary embodiment of the present invention receives geologic semantic objects that are ready to be populated into a database. This exemplary embodiment populates these geologic semantic objects into a database, through a representation in a database schema, forms queries, translates queries, processes queries and fuses multiple results into a coherent result set. In this manner, the present invention provides an efficient and comprehensive model for geological data that allows the formation and processing of complex queries of a database that includes semantic objects that could aid in the discovery of petroleum resources.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1:
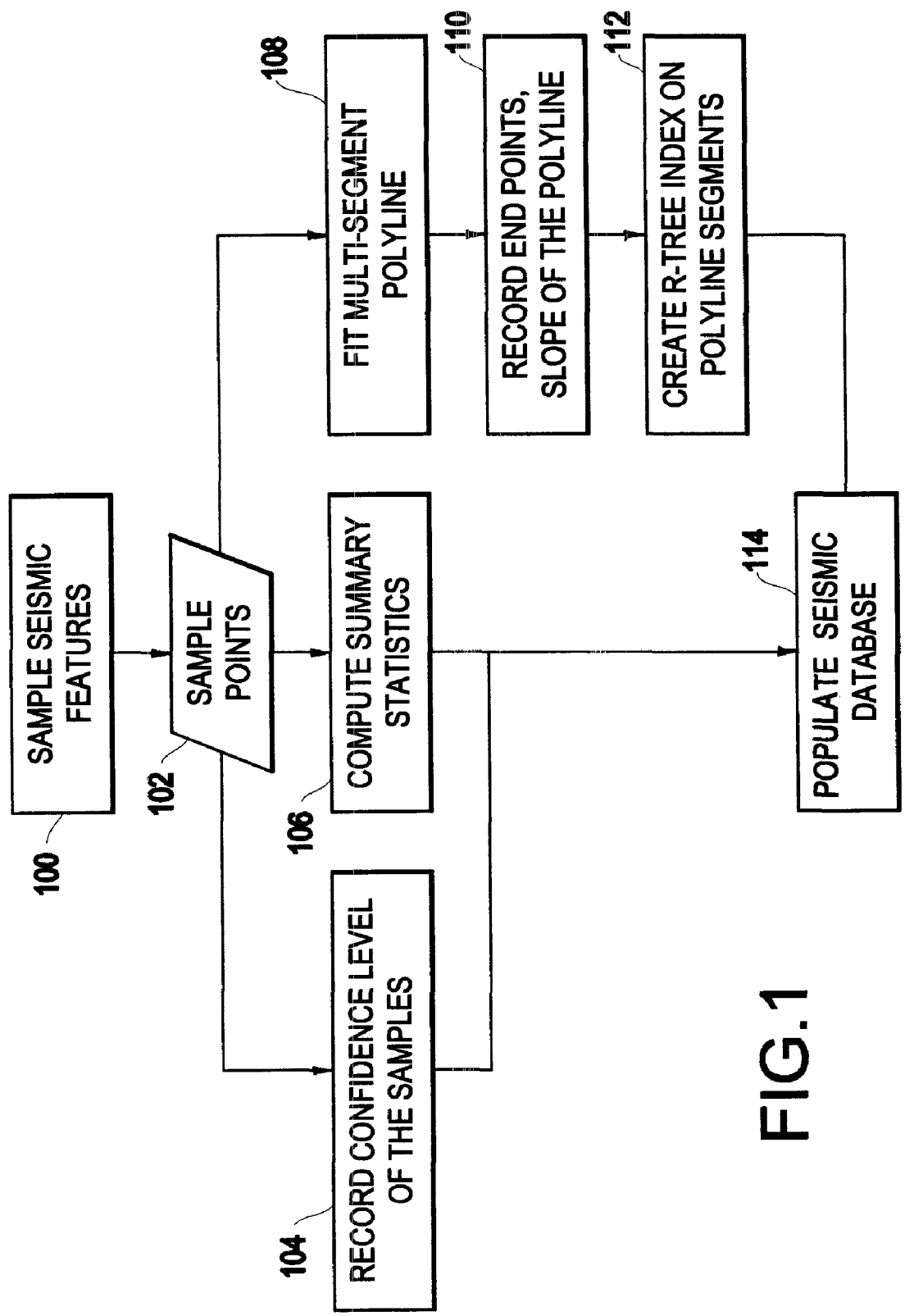
FIG. 1 is a flowchart for an exemplary embodiment for a control routine in accordance with the present invention that populates semantic object data into a database.

Referring now to the drawings, and more particularly to FIGS. 1-8, there are shown exemplary embodiments of the methods and systems according to the present invention.

It is to be appreciated that the term "database" as used herein is intended to include any persistent storage software and systems, such as, for example, a relational database like IBM DB2™ and Oracle 9™, or a file system like NTFS, or disk management like RAID. While the art is preferred to have an implementation on relational databases, which are also used through the preferred embodiment descriptions, it is to be appreciated that a person ordinarily skilled in the art taking the present application as a whole, can substitute relational database with other types of persistent storage.

It is also to be appreciated that the present invention is applicable, not only to management of semantic data related to large collections of seismic and associated geological data, but also to any collection of data with which higher level models may be constructed to yield semantic objects that represent entities in the extant world. Other examples could include but are not limited to weather maps (as mentioned earlier), satellite imagery, data collected from manufacturing processes, etc.

Many systems in which sensors generate a large amount of data via measurements of some set of attributes of a region of interest are applicable domains for this invention. The semantic objects described herein are qualitatively different from simple measurements of attributes. Many scientists and other users are interested in modeling the domain that they are studying, in order to conduct virtual experiments, query the models to find particular phenomena, or identify trends in the evolution of the system under study. Semantic objects are models that represent entities in the modeled space, rather than quantized metrics of some attribute over space.

A system which models objects allows a user to interact with, query, and analyze these objects, rather than simply visualizing a pattern of measurements. The difference is significant. When we perceive the world through our sense of sight, our visual system is sensing and measuring variations in light falling on our retinas. This information is transmitted to the brain, which converts these measurements into objects that we see before us, such as other people, trees, sky, clouds, walls and tools.

Furthermore, we consciously reason about and interact with the world as a set of objects. We can remember objects, compare them to one another, and imagine new objects. We do not perceive or interact with the world with a conscious understanding that it is based upon the responses of the millions of photoreceptors in each retina.

Similarly, an exemplary embodiment of the present invention enables a user to interact with virtual objects rather than simple, raw data. An exemplary process for generating semantic objects from a collection of data is known as "PetroSPIRE" and has been described by Y. C. Chang, M. Hill, C. S. Li, and R. Pepper in "PetroSPIRE: Indexing and retrieval of seismic data for oil and gas exploration" Society of Exploration Geologists Annual Meeting, October 2003 which is incorporated herein in its entirety. An exemplary embodiment of the present invention performs the storage, retrieval, management and analysis of semantic objects that may have already been generated through a process like that one described in the publication listed above.

FIG. 1 illustrates a flowchart for an exemplary embodiment for a control routine in accordance with the present invention that populates semantic object data into a database.

In step 100, the control routine receives semantic geologic objects that may have been created by, for example, the PetroSPIRE process. For example, seismic raw data is collected that may have been acquired during, for example, a seismic survey using standard sensors and recording equipment and which may also include data from other geological survey techniques, such as formation micro imaging, well log traces, and the like.

The semantic objects may be derived from the seismic survey data using a process such as PetroSPIRE. This is similar to a segmentation process, in which spatial regions of the collected data are labeled with a semantic object category name. In seismic data, for example, a set of points may be labeled a "fault," a "horizon," or the like. Thus, the seismic features are sampled.

For each newly labeled semantic object, in step 102, the control routine selects a corresponding set of sample points for population in the database. This may be a strict subset or it may include the entire surveyed data set.

The control routine may then perform any (or all) of three operations on each semantic object. In step 106, the control routine computes summary statistics that summarize the attributes of each semantic object. Summary statistics may include, for example, the number of points in each semantic object, the average value of each attribute within each semantic object, the variance of data within each semantic object, the range of values for the data within each semantic object and the like. The set of statistics computed for each semantic object is application-dependent. Different statistics, for example, are more useful for weather maps than for seismic data.

The control routine also computes a confidence level for each semantic object. The confidence level represents the degree of certainty with which the system has correctly classified and/or labeled the semantic object.

In an exemplary embodiment of the present invention, the confidence levels may range from 0 to 1, with 1 representing certainty. For instance, in a seismic object, a set of three-dimensional pixels (i.e., volume pixels or "voxels") from the corresponding volume of data may be collected to generate a semantic object that is labeled as corresponding to a horizon with confidence level 0.95, if the system determines that the voxels form a cohesive unit that is likely to represent a horizon.

The method and/or system of determining the confidence level for each semantic object is not limited by the present invention. One of ordinary skill in the relevant art understands that confidence level computations are application-dependent and are capable of performing confidence level computations.

In step 108, the control routine obtains a compact approximation of the semantic object. For example, a semantic object that represents a fault line may be approximated by fitting a multi-line segment (i.e., a polyline) through the underlying data points that are represented by the semantic fault line object. In this manner, the amount of data that is used to determine the semantic object may be "compacted" into a much smaller amount of data while still adequately describing the fault line.

While the exemplary embodiment here describes a compact approximation of a fault line semantic object by fitting a multi-segment polyline, one of ordinary skill in the art understands that the type of compact approximation is application-dependent and that there are many different types of compact approximations. The precise nature of the approximation is irrelevant, as long as it serves the function of search and retrieval of the original set of data from the system. In the above example, the compact approximation may use a linear regression technique for a fault line semantic object.

Next, in step 110, the control routine records the attributes of the compact approximation. In the example, for the fault line semantic object, the end points and slope for each segment of the polyline are recorded.

Then, in step 112, the control routine generates an index to the recorded compact approximations. For the example of fault line semantic objects, an R-tree spatial index structure may be computed to facilitate retrieval of the structure that approximates a polyline.

Lastly, in step 114, the control routine populates a database with the confidence levels of each semantic object, the summary statistics of each semantic object and the indexed compact approximations.

Figure 2:
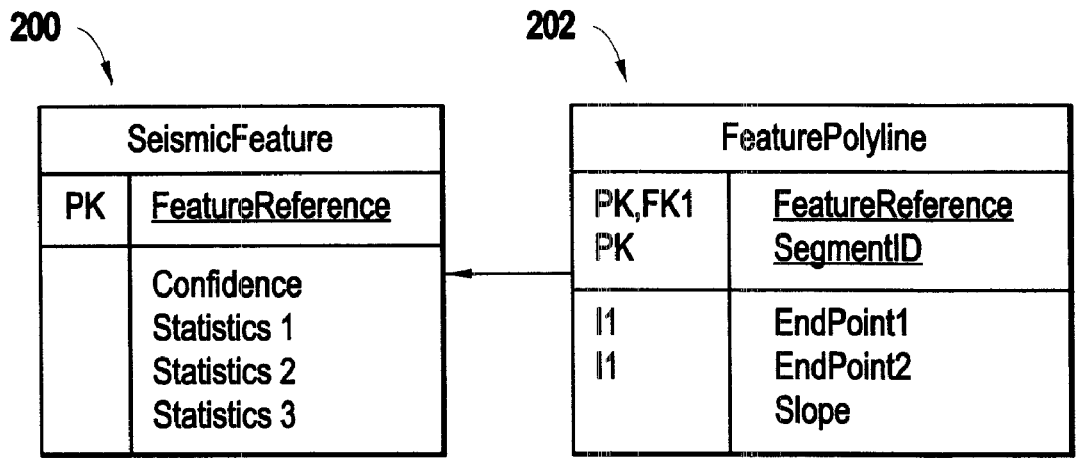
FIG. 2 illustrates an exemplary portion of the database generated by the control routine of FIG. 1.

FIG. 2 illustrates an exemplary portion of the database generated by the control routine described above. In particular, FIG. 2 illustrates a database schema, which is application-dependent, in an exemplary embodiment for seismic data. The SeismicFeature table 202 has a primary key "PK" called the "FeatureReference." This table stores the summary statistics and confidence level for each semantic object. FeaturePolyline 202 is the second table. The primary key in this table is "Segment ID." Multiple segments can be used to represent each feature, and are linked to the SeismicFeature table (200) by foreign key "FeatureReference." In other words, the FeaturePolyline table 202 is a table that stores attributes of a compact approximation of a corresponding semantic object.

Figure 3:
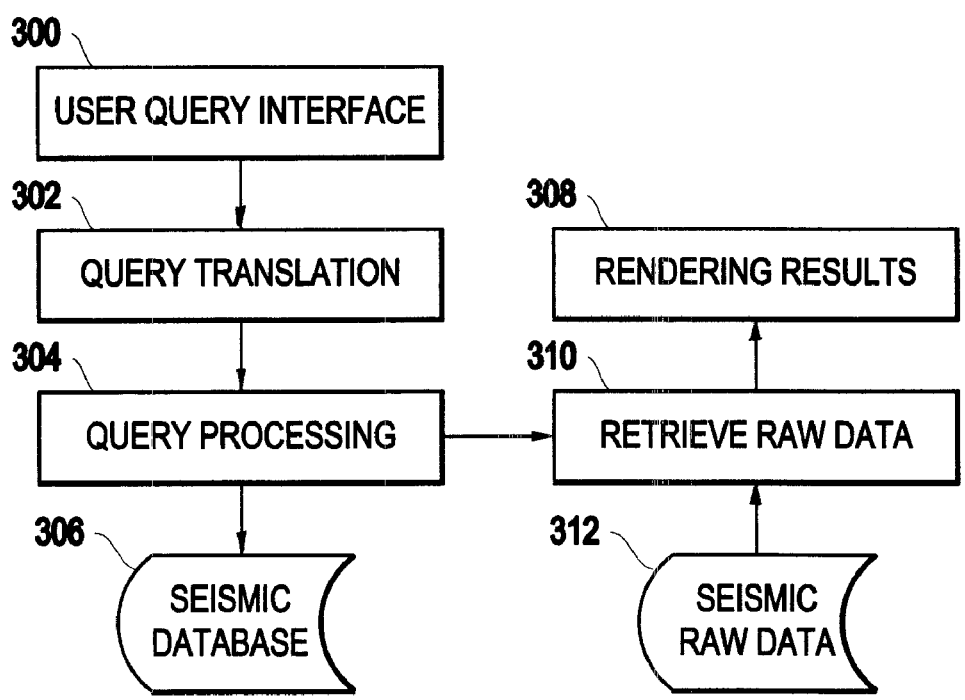
FIG. 3 illustrates an exemplary system architecture of a query translation and processing system in accordance with the present invention.

FIG. 3 illustrates an exemplary system architecture of a query translation and processing system in accordance with the present invention. In other words, FIG. 3 provides an overview of the functioning of an exemplary embodiment of the present invention at run time.

Figure 4:
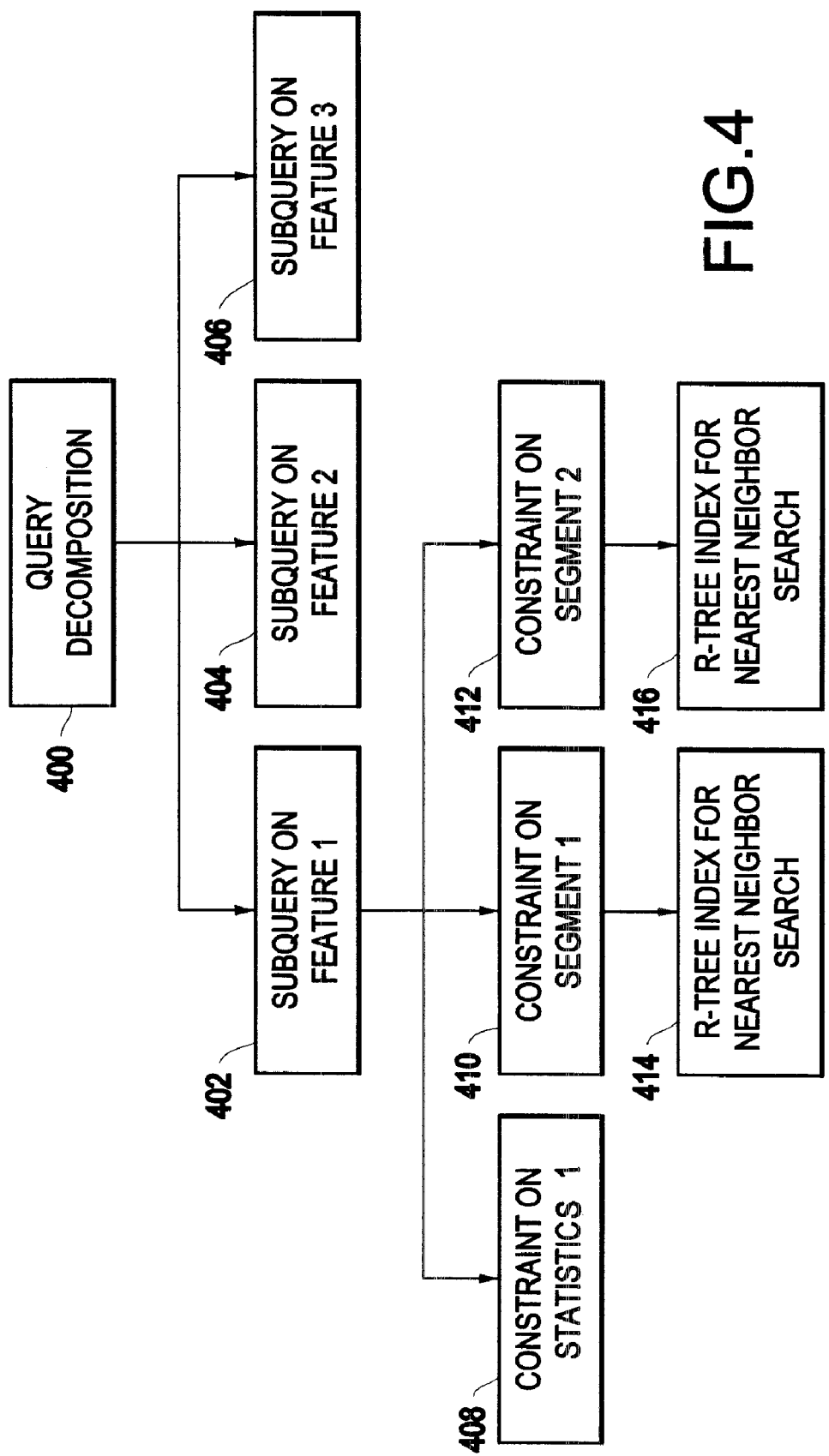
FIG. 4 illustrates a portion of the query translation process in accordance with the architecture of FIG. 3.

The system first generates a query interface at step 300 and receives a query from a user through the user interface. The query may be submitted by the user in terms of attributes for semantic objects that may involve several different features (i.e. attributes). The query received at step 300 is translated into sub-queries at step 302 using the control routine that is illustrated in FIG. 4.

Next, the sub-queries are executed (i.e. processed) by a query processing module in step 304. The query-processing module may rely on both the semantic object database 306 and, indirectly, on the raw data of the application domain 312 from which the semantic object database was created. The process of query execution is detailed in FIG. 5.

Lastly, the raw data that corresponds to the semantic objects that were retrieved based upon the query may be retrieved and rendered for the user on a display (not shown).

In this manner, the present invention enables a user to query a database of semantic objects based upon the attributes of those semantic objects and to retrieve corresponding semantic objects, as well as, the raw data that comprises the retrieved semantic objects.

As explained above, FIG. 4 illustrates an exemplary query translation method and system. Such query translation may be valuable because the semantic objects may not be composed of attributes that were generated from a single, homogenous modality but may include attributes that are derived from a variety of modalities.

The system and method shown in FIG. 4, includes a query decomposition module 400 that divides the query provided by the user into one or more homogeneous components applicable to a class of semantic objects or feature (i.e. to satisfy constraints on the type of object, such as a fault object, horizon object, and the like). For example, in the seismic domain, a class of semantic object (or feature) may be a horizon object, and a distinct class of object may be a fault object.

Each of the sub-query components 402, 404, and 406 may then be translated into constraints on compact approximations or summary statistics. Constraints upon the compact approximations may include, for example, a constraint on each polyline segment 410, and 412 of a multiple segment polyline. Constraints on polyline segments may then be used by R-tree index structures 414, and 416 to search for matching polyline segments in the semantic object database.

Figure 5:
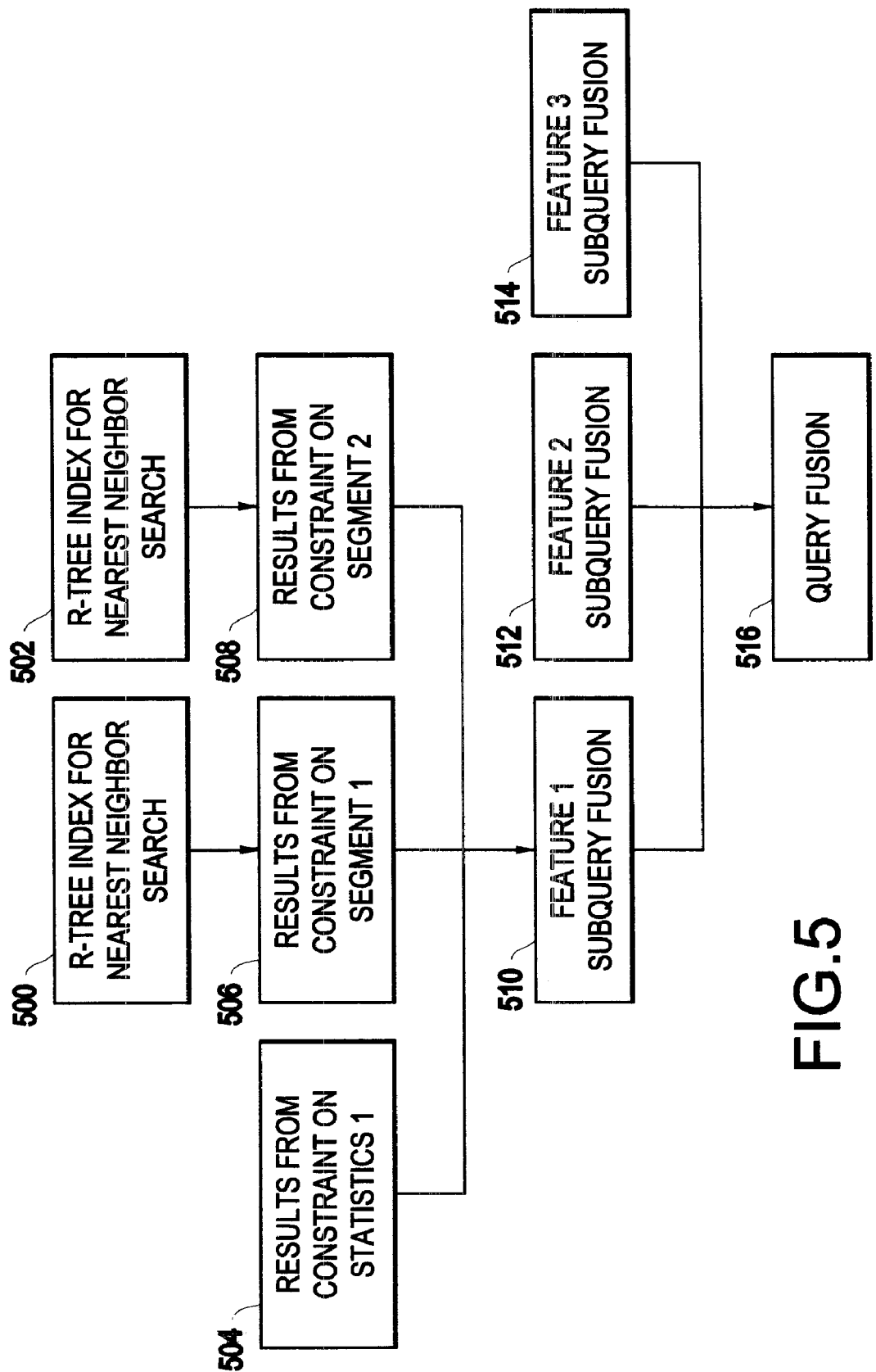
FIG. 5 illustrates a portion of the query translation process in accordance with the architecture of FIG. 3.
Figure 7:
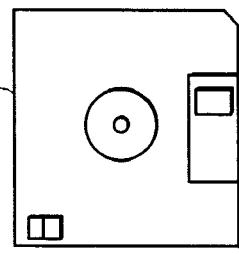
FIG. 7 illustrates a signal bearing medium 700 (e.g., storage medium) for storing steps of a program of a method according to the present invention.

FIG. 5 illustrates a portion of the query translation process of step 304 in accordance with the control routine of FIG. 3. In this exemplary embodiment, multiple instances of a compact approximation indexing structure is used to search for and identify compact approximations of semantic objects that correspond to those types of semantic objects that were specified in the query.

In our particular example, multiple instances of an R-tree indexing structure 500, and 502 may be used to identify segments of poly-line representations in the semantic object database which satisfy the constraints 506, and 508 on each semantic object attribute (feature) that is specified in the query. The results from the constraint on summary statistics 504 may also be indexed by an R-tree, if the nature of the statistics is spatial. Otherwise this retrieval may be done via linear indices or a scan of all possible elements.

Next, the results from the multiple constraints on a single feature may be fused together into a result for that feature class. This fusion process is represented by 510, 512, and 514 for each of three exemplary feature classes.

Examples of feature classes in seismic data include horizon semantic objects, faults semantic objects, sand channel semantic objects and the like. These distinct semantic classes are each represented in a system with summary statistics and multi-component polylines. Each result component and relevant statistics may be fused at the level of the feature-specific sub-query.

For example, a sub-query may request a horizon having an average strength over 50 normalized reflective units, that contains at least one polyline component having a slope of at least 15 degrees, and at least one other polyline having a slope that is more negative than −15 degrees. This would represent a strong horizon with a peak or capped portion that could act as part of a petroleum reservoir. Sub-query fusion block 510 may combine the constraints of average strength with the two segment constraints that correspond to slope.

Likewise, sub-query fusion blocks 512 and 514 may process additional constraints on other feature classes, such as finding faults having lengths that are greater than 100 meters and slopes between 80 and −80 degrees. Finally, overall query fusion 516 combines the constraints on combinations of feature classes (semantic objects).

To continue the previous example, a full query may have been to find semantic objects that represent strong horizons that are peaked or capped and nearby faults that are long and steeply angled. The fusion block 516 may then process constraints on the common attributes of different feature classes, such as a spatial position or a volume. Other applications may include many other common attributes, such as velocity, temperature, or other metrics.

One aspect of fusion in an exemplary embodiment, in all instances where it is used here, is that the results of fusion are newly created semantic objects of a compound feature class. These compound semantic objects can be stored in a database with minimal storage space, since they are also semantic objects, and can also be retrieved later as part of the usual search process. Once all the results have been fused together and have fulfilled the constraints of the query, they may be returned to the user.

Figure 6:
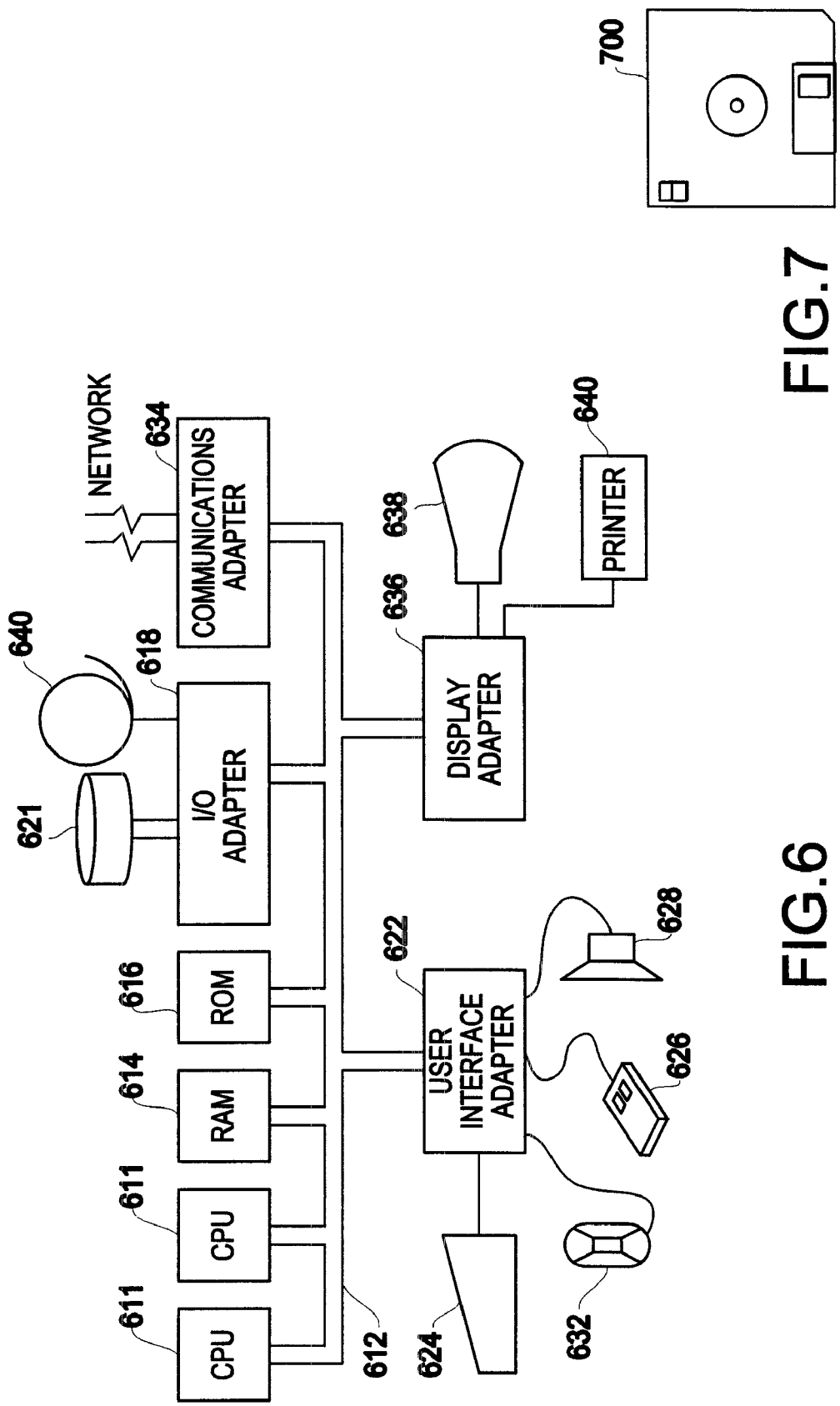
FIG. 6 illustrates an exemplary hardware/information handling system 600 for incorporating the present invention therein.

FIG. 6 illustrates a typical hardware configuration of an information handling/computer system for use with the invention and which preferably has at least one processor or central processing unit (CPU) 611.

The CPUs 611 are interconnected via a system bus 612 to a random access memory (RAM) 614, read-only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communication adapter 634 for connecting an information handling system to a data processing network, the Internet, an Intranet, a personal area network (PAN), etc., and a display adapter 636 for connecting the bus 612 to a display device 638 and/or printer 640.

In addition to the hardware/software environment described above, a different aspect of the invention includes a computer-implemented method for performing the above-described method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

This signal-bearing media may include, for example, a RAM contained within the CPU 611, as represented by the fast-access storage for example. Alternatively, the instructions may be contained in another signal-bearing media, such as a magnetic data storage diskette 700 (FIG. 7), directly or indirectly accessible by the CPU 611.

Whether contained in the diskette 700, the computer/CPU 611, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Figure 8:
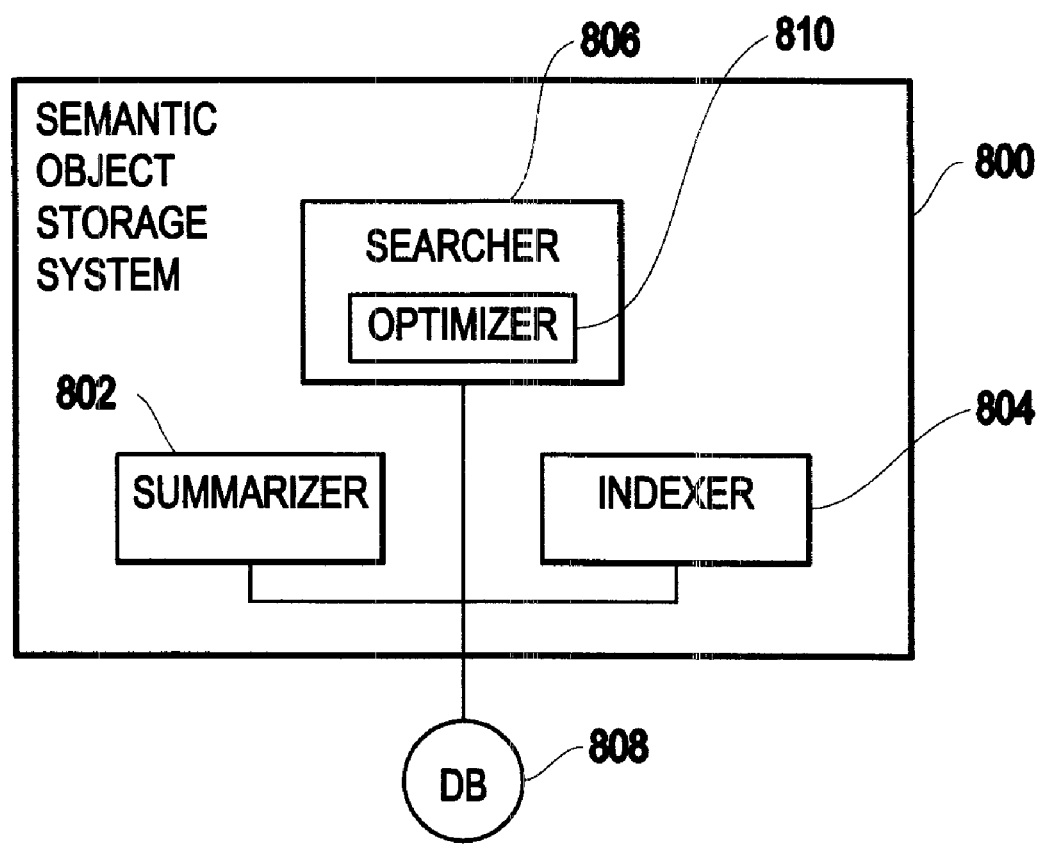
FIG. 8 is a semantic object storage system architecture 800 for an exemplary embodiment of the present invention.

FIG. 8 illustrates a semantic object storage system architecture 800 in accordance with an exemplary embodiment of the present invention. The semantic object storage system 800 includes a summarizer 802, an indexer 804, and a searcher 806. The semantic object storage system 800 is in communication with a database 808.

The summarizer 802 is adapted to receive previously defined semantic objects and to generate a summary of attributes for each of the semantic objects and then store those summaries in the database 808.

The indexer 804 is adapted to generate an index to the attribute summaries that were generated by the summarizer 802 and also to store the index in the database 808.

The searcher 806 is adapted to search the database 808 in accordance with the methods that were described above.

Optionally, the searcher 806 may include an optimizer 810 that optimizes the searching that is performed by the searcher 806.

It is to be understood, that the database 808 may form a portion of the system 800 of the present invention, rather than being external to the system 800 as illustrated by FIG. 8 and still fall within the scope of the present invention.

With the unique and unobvious features of the present invention, a novel method and system is provided for storing, indexing and searching semantic objects.

While the invention has been described in terms of several exemplary embodiments, those skilled in the art will recognize that the invention can be practiced with modification.

Further, it is noted that, Applicant's intent is to encompass equivalents of all claim elements, even if amended later during prosecution.

The invention claimed is:

1. A method for storing information for one or more semantic objects derived from raw data, the method comprising:
   receiving, from a memory, a semantic object extracted from said raw data and classified to comprise said semantic object, said received semantic object having one or more attributes;
   using a processor on a computer for:
      generating a summary of attributes of said received semantic object, by calculating one or more statistics of one or more of said attributes of said received semantic object;
      computing a confidence level of said received semantic object, using corresponding raw data of said received semantic object, wherein the computed confidence level quantifies a degree of certainty that said received semantic object has been correctly classified and/or labeled; and
      generating a compact representation of said raw data of said received semantic object;
   generating indexing information for said generated summary of attributes and said generated compact representation of said semantic object; and
   storing the semantic object along with its associated summary of attributes, confidence level, compact representation, and indexing information in a semantic object database associated with a database storing said raw data.

2. The method of claim 1, wherein the summary of attributes, confidence level, and/or compact representation is generated and stored in said semantic object database for each of a plurality of said semantic objects and said semantic object database can be searched.

3. The method of claim 2, wherein a query used to search said semantic object database will identify any of a semantic object having attributes that match one or more terms of said query and the identified semantic object can selectively be retrieved, including selectively retrieving at least one of:
   any information in said semantic object database associated with said identified semantic object; and
   any of the raw data associated with said identified semantic object.

4. The method of claim 2, wherein an optimizing mechanism is used in searching to optimize a process of searching.

5. The method according to claim 4, wherein an R-tree spatial index structure is used to facilitate a retrieval of a structure that approximates a polyline segment comprising said compact representation.

6. The method according to claim 4, wherein said compact representation comprises a multiple segment polyline and each segment of said polyline comprising said compact representation is searchable using one or more terms of a sub-query of a query.

7. The method of claim 2, wherein:
   a query is decomposed into sub-query components that are translated into constraints on compact representations or summary statistics,
   results from multiple constraints on a single feature are fused together into a fused result for a class of that feature, and
   said fused result creates a new semantic object of a compound feature class.

8. The method of claim 1, wherein the semantic object represents a model of a phenomena of interest that is measured by a collection of data which exceeds a data size that is accessible with a predetermined efficiency by multiple simultaneous users.

9. A method of deploying computer infrastructure, comprising integrating computer-readable code into a computing system, wherein the code in combination with the computing system is capable of performing the method of claim 1.

10. The method according to claim 1, wherein the raw data comprises geological seismic survey data and said semantic object has been previously extracted from said geological seismic survey data and comprises one or more of:
   a fault;
   a horizon;
   a channel; and
   one or more subcomponents of any of the above semantic objects.

11. The method of claim 1, wherein said summary of attributes and said confidence level of said semantic object are stored in a first table and said compact representation of said semantic object is stored in a second table linked to said first table.

12. A storage medium having tangibly embedded therein a program of computer readable instructions executable by a digital processor, the program comprising the method of claim 1.

13. The method of claim 1, wherein:
   said one or more statistics calculated for the received semantic object comprises one or more of:
      a number of points in said semantic object;
      at least one variance of data within said semantic object; and
      at least one range of values for data within said semantic object;
   said confidence level comprises a value between 0 to 1; and said compact representation comprises fitting a multiple segment polyline through underlying data points that represents said semantic object.

14. The method of claim 13, wherein each segment of said multiple segment polyline comprises a best fit line having end point coordinates and a slope.

15. The method of claim 14, wherein said indexing information for said compact representation of said semantic object comprises said endpoint coordinates and said slope of said multiple segment polyline for said semantic object.

16. A system for storing a semantic object, the system comprising:
   a semantic object summarizer, as executed by a processor on a computer, that receives a previously-defined semantic object extracted from raw data and classified to comprise said semantic object, said received semantic object having one or more attributes, said semantic object summarizer for:
      generating a summary of attributes of said received semantic object by calculating one or more statistics of one or more of said one or more attributes of said received semantic object;
      calculating a confidence level of said received semantic object, using corresponding raw data of said received semantic object, wherein the computed confidence level quantifies a degree of certainty that said received semantic object has been correctly classified and/or labeled; and
      generating a compact representation of said raw data of said received semantic object;
   an indexer, as executed by said computer, that generates indexing information for the generated summary of attributes and the generated compact representation of said semantic object; and
   a database that stores said semantic object along with its associated summary of attributes, confidence level, compact representation, and indexing information as a semantic object database associated with a database storing said raw data.

17. The system of claim 16, wherein the summary of attributes, confidence level, and/or compact representation can be generated and stored in said semantic object database for each of a plurality of said semantic objects and said semantic object database can be searched, said system further comprising a searching mechanism, executed by a computer, that permits a user to search the semantic object database.

18. The method of claim 1, wherein the semantic object database comprises a plurality of said semantic objects along with their respective associated summary of attributes, confidence level, compact representation, and indexing information, and the semantic object database can be searched and objects retrieved and displayed to a user.

* * * * *